Aug. 31, 1965 E. WAINER 3,203,758
UTILIZATION OF STEEL MILL PICKLE LIQUOR
Filed Oct. 30, 1962
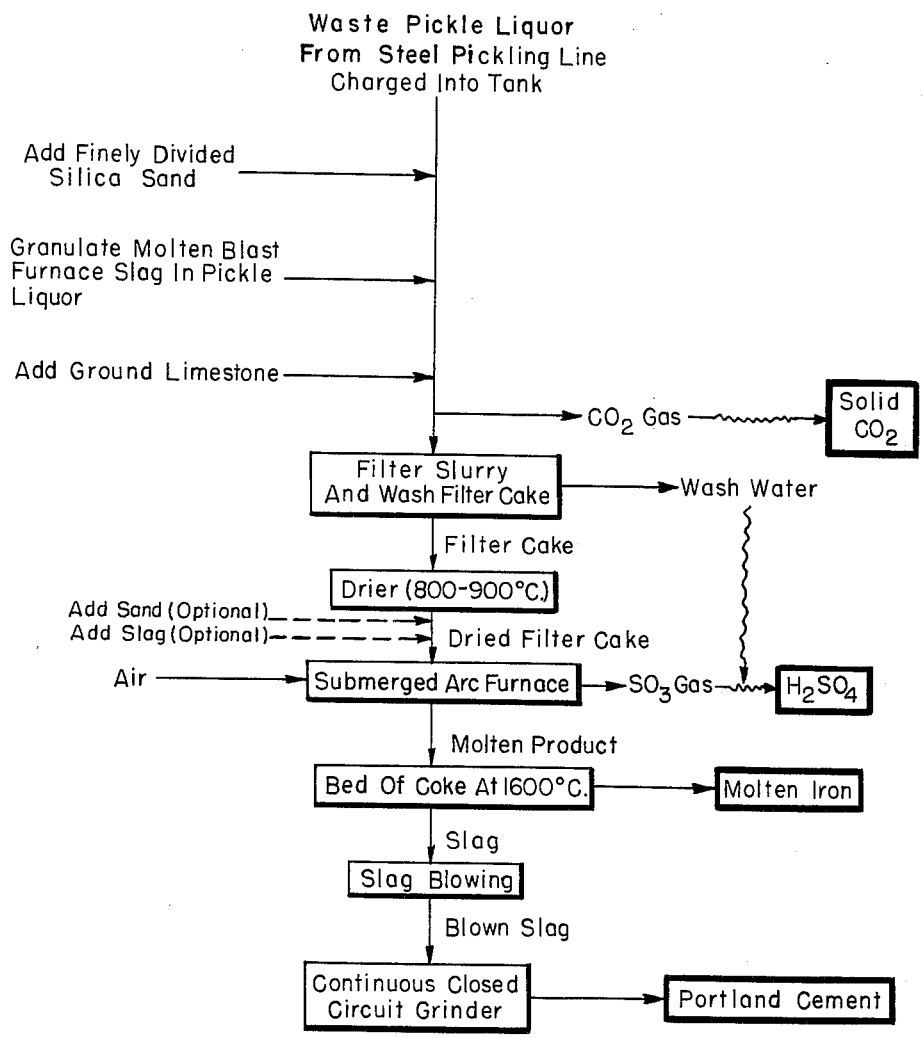
INVENTOR.
Eugene Wainer
BY
Lawrence I. Field
ATTORNEY United States Patent Office 3,203,758
Patented Aug. 31, 1965

3,203,758
UTILIZATION OF STEEL MILL PICKLE LIQUOR
Eugene Wainer, Shaker Heights, Ohio, assignor to Horizons Incorporated, Cleveland, Ohio, a corporation of New Jersey
Filed Oct. 30, 1962, Ser. No. 234,065
2 Claims. (Cl. 23—167)

This invention relates to a method for the utilization of spent pickle liquor as available in pickle operations in the manufacture of steel in which not only is the problem of disposal of such spent liquor eliminated but, in addition, such spent liquor is utilized as a valuable raw material for the production of important chemicals of commerce on a profitable basis. More particularly the present invention resides in techniques for complete recovery of usable sulphuric acid from the pickle liquor, together with saleable byproducts such as Portland cement, pig iron, and pure carbon dioxide.

The most common method for removing scale from process steel is the immersion of the steel product in hot dilute sulphuric acid solution. The pickling operation may be operated batchwise or in a continuous system. As a consequence of reaction between the sulphuric acid, metallic iron and its oxides a spent liquor is obtained. In the case of batch processing the spent liquor usually contains between 0.5 and 2% free sulphuric acid and 15 to 22% ferrous sulfate when calculated in the anhydrous condition. In a continuous pickling operation, spent liquor generally averages 4 to 7% free acid and 14 to 16% ferrous sulfate. Spent pickle liquor having analyses in the ranges given has, up to the present, little commercial value and it is produced in the United States at the rate estimated to be in excess of 1 billion gallons annually.

The primary problem with respect to the spent liquor situation has been one of disposal rather than utilization. In some instances such spent pickle liquor has been discharged directly to the sewer with suitable additions of fresh water. In other instances this is not permitted and the pickle liquor has been neutralized with lime and transferred either to deep wells or to ponds eventually producing a solid product as liquid products of the neutralization reaction gradually seep through the soil into fresh water sources. As a consequence of pollution of fresh water sources, particularly in large industrial areas in close proximity to cities or otherwise well populated areas disposal by discharge to sewers is being objected to and it is anticipated that this objection will reach such proportions in the relatively near future that it will be no longer permitted. The neutralization of the spent pickle liquor with lime requires very large tracts of waste land a very considerable distance from potable water sources. The problem has reached such magnitude that in many cases the lime neutralized liquor is dumped into barges, carried out to sea several miles from shore, and dumped into the ocean where the dilution is sufficient to eliminate the problem. In any case disposal of spent pickle liquor represents a serious problem, increasing in expense and eventually reaching a stage where disposal on land will not be permitted. For steel plants which are relatively inland from sea water the expense of disposal will be such as to make the cost of this aspect of steel operation potentially prohibitive.

Many attempts have been made to utilize spent pickle liquor as a raw material for producing byproducts which either may be recycled in the pickle operation or utilized as an article of commerce. In general previously devised processes have emphasized the following items:

(1) The manufacture of ferrous or ferric sulfate in various stages of hydration.

(2) The recovery of sulphuric acid values and return to the pickle liquor line.

(3) The manufacture of electrolytic iron plus sulphuric acid.

(4) The manufacture of iron powder.

(5) The manufacture of special grades of iron oxide for pigments or polishing rouge plus the return of sulphuric acid values to the pickle line.

(6) The manufacture of iron oxide and ammonium sulfate, the first product being used as a raw material for the open hearth and the latter being used as a fertilizer material.

(7) The manufacture of a construction type material designated in the trade as "Ferron" in competition with natural gypsum materials.

None of these approaches which have been attempted in the past relative to the utilization of spent pickle liquor has been uniformly successful in solving the problem presented by the necessity for economically and if possible profitably disposing of the immense quantities of spent pickle liquor which are continually being generated.

A principal object of this invention is to provide a process for utilizing spent pickle liquor in a manner such that in the process no waste is developed which presents a disposal problem potentially restricted by law.

It is a further object of the invention to provide a process in which all of the products obtained therefrom be available for sale or for reuse in the pickling process itself.

It is still another object of this invention to utilize spent pickle liquor in the amounts normally available from a large integrated steel complex as a raw material for the production of chemicals which either may be reused with full facility in their original form or which enjoy a market more than ample to account for the spent pickle liquor now being produced in the United States.

A further object of the invention is to provide a process which permits the manufacture of any of a number of grades of Portland cement, by suitable adjustment of one or more steps in the process.

Another specific object of the invention is to provide a process in which the values in spent pickle liquor are recovered as sulfuric acid, returnable to the pickling process and an iron product useful in the manufacture of more steel to be pickled.

Another object of the invention is the recovery of carbon dioxide in saleable form.

These and other objects of the invention will be better understood by reference to the flowsheet illustrative of a preferred mode of carrying out the invention.

As schematically indicated in the drawing the practice of my invention in its preferred form involves the following:

(1) The substantially complete recovery of all the pure sulphuric acid originally placed in the pickle line;

(2) The simultaneous manufacture of large quantities of specification grade Portland cement;

(3) The manufacture of substantial quantities of molten iron suitable for direct feed to the open hearth;

(4) And, finally, the manufacture of substantial quantities of pure carbon dioxide which may be bottled for sale purposes.

In general my novel process comprises the following sequence of process steps:

(1) Waste pickle liquor from the pickle line is pumped to a precipitation tank;

(2) Ground silica is added to the liquor in the tank;

(3) Molten blast furnace slag is granulated, by direct quenching of the hot slag into the pickle liquor-silica mixture in the tank;

(4) Ground limestone is then added to the tank, with stirring, and the gases developing as a result of the ensuing reaction (consisting primarily of wet carbon dioxide) are first dried and then collected in a suitable chamber for the preparation of solid carbon dioxide;

(5) The slurry in the precipitation tank (formed as the result of the addition of calcium carbonate and after the elimination of the carbon dioxide represents a mixture of hydrated calcium sulfate, hydrated oxides of iron, silica and blast furnace slag) is passed to a filter press wherein it is filtered and washed, the wash water is reserved as process water;

(6) The filter cake is dried in a waste heat dryer from which it emerges as relatively hard porous pieces or pellets, at a temperature between 800 and 900° C.;

(7) The hot dry filter cake is fed directly to a shaft located directly above the hearth of a submerged arc furnace wherein a hearth temperature of about 1800° C. is maintained, in order to insure that the contents in the hearth remain molten. Air is blown into the porous charge in the lower portions of the stack. As a consequence, all of the sulphur trioxide bound in the calcium sulfate is evolved from the dried pellets, this evolution being accelerated by the catalytic action of the iron oxides in the same. The evolved sulphur trioxide is passed to a collector and then through an electrostatic precipitator; and the process water originally used and available as the filtrate from the original filtration is used to absorb this sulphur trioxide after it leaves the electrostatic precipitator the sulphuric acid is reconstituted;

(8) The fused mass is then flowed into the upper end of a second heated chamber containing hot coke and as a result the iron oxide in the melt is reduced to metallic iron of blast furnace quality which collects at the base of the chamber, along with a slag consisting primarily of a mixture of the oxides of calcium, alumina and silica which floats on the pool of iron. The hot iron is tapped to a hot ladle and may be used as a feed for the open hearth or it may be cast into pig iron. The molten slag is tapped and the slag is blown to facilitate subsequent grinding. The blown slag is then ground in continuous closed circuit grinders to produce the particle size required by federal specifications for Portland cement.

As a consequence of these operations substantially all of the sulphuric acid originally utilized in the steel pickling operation is returned in usable form to the pickling line, the process water is retained in tanks for reuse if desired, or may be dumped to the sewer without fear of causing pollution, but more important, Portland cement, molten iron suitable for open hearth feed, and relatively pure carbon dioxide, are also recovered so that the operation may be carried out profitably.

The following is a specific example of the method of practicing the procedure described above.

Spent pickle liquor containing 0.6 pounds of sulphuric acid and 1.6 pounds of ferrous sulfate heptahydrate per gallon, obtained directly from a continuous pickling line was pumped to a precipitation tank fitted with suitable conveyor inlets, stirrers and a bell top for eventual collection of the carbon dioxide to be evolved in later stages of the operation. By the time the transfer of 120 gallons was completed the temperature of the spent pickle liquor had dropped from about 90° C. to about 70° C. This 120 gallons of pickle liquor contained 193 pounds of heptahydrate of ferrous sulfate and 72.3 pounds of 100% sulphuric acid. 18 pounds of −200 mesh silica sand was added to the stirred solution and thereafter 115 pounds of molten blast furnace slag having the composition shown in Table I was added to the tank in a thin stream with violent stirring so as to insure granulation. As a consequence of such addition the boiling point of 105° C. was reached in the latter stages of the addition. The mixture was stirred until boiling ceased and thereafter 170.4 pounds of low magnesia limestone previously ground to 200 mesh was added slowly with stirring, taking 30 minutes for the addition in question. The thick slurry was then stirred while air was bubbled through the mixture for 30 minutes longer. The offgases consisting chiefly of wet carbon dioxide were collected through the bell assembly and passed to a reflux system maintained at approximately 10° C. to remove the water. The substantially pure carbon dioxide was then piped to a gas holder for collection and recovery. As the result approximately 36 pounds of carbon dioxide were obtained representing a 97.5% recovery.

After all evolution of carbon dioxide had ceased the thickened slurry was pumped to a vacuum filter press and given a single wash with water. The wash water was pumped to a tank for later use. The filter cake was stripped from the filter in the form of pieces approximately 1 cubic inch in volume and then dried in a direct heat rotary dryer at temperatures up to a red heat, after which is was conveyed to a furnace site. While in large scale use conical bottom submerged arc furnaces would be used, in this example an open top furnace in the shape of a cone was utilized, the bottom portion of which was lined with zirconia refractory with an outside susceptor made of graphite and the sloping sides of the cone are also lined with zirconia refractory. The top of the furnace was fitted with a bell for gas collection purposes. The bottom portion of the furnace was maintained at a temperature of 1800° C. by induction heating which produced a highly fluid melt from the mixture loaded into the furnace and sulphur trioxide was given out in the form of a fume from the top of the furnace. This sulphur trioxide was passed through the mix above the fusion zone and thence through an electrostatic precipitator and thence to a water scrubber utilizing the wash water from the filtration step above for scrubbing purposes. The amount of water utilized for scrubbing was adjusted so as to produce a 50% sulphuric acid solution. The solution obtained weighed 340 pounds and contained 163 pounds of pure sulphuric acid, representing a 96% recovery. Analysis of the slag produced shows less than 0.1% S so that the few percent off theoretical yield is obviously due to the inefficiencies of the scrubbing system.

Returning now to the fused melt, the highly fluid molten slag was dripped into a second inductively heated chamber maintained at a temperature of 1600° C. and containing 50 pounds of coarse metallurgical coke in which the molten material was held for the space of 5 minutes. Thereafter the entire melt was tapped out onto a cold iron plate for rapid chilling. The majority of the coarse coke remained behind. The melt cracks off the cold iron plate on cooling and is crushed and separated magnetically. The nonmagnetic slag weighed 115 pounds. The magnetic portion weighed 24 pounds. Analysis indicated that it contained 97% metallic iron, the balance being primarily carbon and other impurities. The yields were slightly higher than theoretical. The slag was ground to pass a 200 mesh screen and on admixture with water was found to exhibit the properties of a high early strength white Portland cement. The analysis of the Portland cement in dry form produced from this operation is given in Table II.

TABLE I

*Analysis of blast furnace slag used in example*

| | Percent by weight |
|---|---|
| SiO₂ | 35.05 |
| Al₂O₃ | 12.40 |
| CaO | 45.28 |
| MgO | 3.80 |
| S | 1.80 |
| Others | 1.67 |

TABLE II

*Analysis of Portland cement produced in example*

| | Percent by weight |
|---|---|
| SiO₂ | 25.5 |
| Al₂O₃ | 6.2 |
| CaO | 65.5 |
| MgO | 1.9 |
| Fe₂O₃ | 0.3 |
| S | 0.08 |
| Others | 0.52 |

There are approximately six basic types of Portland cement being manufactured commercially at this time. As defined by the A.S.T.M. specifications, the first five types are designated by the respective Roman numerals from I through V and the sixth type is designated as white Portland cement. A number of variations such as "high early strength," high alumina and the like are also produced. Approximately 90 to 94% of present cement production in the United States is represented by types I and II. The purest form of Portland cement is the white Portland cement.

The example above dealt only with white Portland cement, this being the most difficult to produce. The other five types of commercial Portland cement may be made very readily by very slight variations in conditions. For example, to retain a small amount of iron in the slag the amount of coke utilized for reduction to metallic iron is diminished to an amount very slightly less than that sufficient for complete reduction. In addition, suitable changes in the amounts of ground silica added and the blast furnace slag utilized may also be made in accordance with variations in the analysis of the slag and to meet the necessary local or Federal specifications for a particular type of cement for construction purposes. In the example above the process was carried out so that the reduction of the iron was complete so as to substantially eliminate the iron entirely from the cement raw material, thereby yielding a type VI or white Portland cement.

It will be apparent that many changes may be made in the process without departing from the spirit of the invention. Thus while the example described a batch process, one or more steps in the process may be carried out continuously. Further, instead of limestone, other alkaline earth compounds may be used in the process in order to produce cements with modified properties. For reasons of economy calcareous materials are preferred and in order to recover carbon dioxide, the use of limestone is particularly preferred.

Furthermore while reference has been made to the evolution of sulfur trioxide in the description above, it is to be understood that the gases produced by heating of the dried filter cake composed of calcium sulfate and the oxides of silicon, calcium, aluminum and iron, in an oxidizing atmosphere, comprise a mixture of sulfur trioxide and sulfur dioxide which is quickly converted to sulfur trioxide in the presence of the oxides in the heated filter cake.

Instead of quenching molten slag in the spent pickle liquor, it may be found preferable to mix the filter cake or the dried filter cake with up to 100% of the silica sand and up to 100% of the blast furnace slag which is utilized, in the process to produce the desired grade of Portland cement, thereby reducing wear on the filter and drying equipment and on the pumps and material handling equipment serving the same.

It is not intended that the invention be limited except as required by the appended claims.

I claim:

1. A process for the recovery of valuable products from waste spent pickle liquor, which comprises:

establishing a body of said waste spent pickle liquor;

adding finely divided silica sand thereto;

thereafter adding molten blast furnace slag to the mixture of sand and pickle liquor, thereby simultaneously quenching the slag and effecting a reaction between the slag and the mixture;

adding finely divided calcium carbonate to the resulting mixture;

collecting and recovering the carbon dioxide produced as a result of the reaction between the added calcium carbonate and the said mixture;

separating the remainder of the mixture into a predominately liquid containing portion and a portion which is principally solid and recovering each of said portions separately;

drying the solid portion;

heating and melting the dried solid portion while exposed to oxidizing conditions, thereby producing oxides of sulfur as a gaseous product and an oxide melt containing the remaining constituents in said solids;

collecting the sulfur oxide gases;

conveying the collected sulfur oxide gases to the previously recovered liquid portion and reacting the gases and said liquid thereby producing sulfuric acid;

recovering the sulfuric acid as a second valuable product;

contacting the oxide melt with highly heated solid carbon heated to about 1600° C. to reduce at least a substantial portion of the iron oxides in said oxide melt to metallic iron, while the more refractory oxides in said oxide melt are not reduced by the carbon;

collecting the mixture of molten iron and molten refractory oxides;

separating the molten iron from the molten oxides and recovering the molten iron;

and recovering the molten oxides as a product suitable for use as a Portland cement.

2. A process for the production of Portland cement and sulfuric acid from spent pickle liquor and blast furnace slag which comprises:

effecting a chemical reaction between said pickle liquor and finely divided calcium carbonate;

introducing blast furnace slag into a body of said reacted liquor;

adding silica sand to the resulting mixture;

separating the resulting slurry into a first portion which is principally liquid and a second portion which is principally solid;

heating said second portion to a temperature approaching red heat, thereby drying the said second portion and producing a porous hard dried solid product;

establishing a body of said dried solids in a furnace;

melting the lowermost portion of said body of hot dried solids and concurrently introducing air into the body of heated solids above a region in which said melt exists, whereby the sulfur in said heated solids is evolved as sulfur trioxide;

passing the sulfur trioxide into said first liquid portion to form a solution of sulfuric acid and recovering the same;

and bringing the melt into physical contact with a heated reducing agent comprising a metallurgical cake heated to about 1600° C. whereby a substantial fraction of the iron oxide in said melt is reduced to metallic iron and the remainder of said melt forms an oxide slag; and recovering said metallic iron as one product and said oxide slag as another; and grinding said oxide slag to a particle size suiting it to use as a Portland cement.

References Cited by the Examiner

UNITED STATES PATENTS

| | | | |
|---|---|---|---|
| 706,111 | 8/02 | Riesberg | 23—150 |
| 1,073,820 | 9/13 | Richards | 106—103 |
| 1,197,331 | 9/16 | Basset | 106—103 |
| 2,250,186 | 7/41 | Noll | 23—117 X |
| 2,532,548 | 12/50 | Heide | 65—19 |
| 2,901,321 | 8/59 | Horn | 23—178 X |
| 3,129,063 | 4/64 | Zirngibl | 23—177 X |

OTHER REFERENCES

Hodge: "Waste Problems of the Iron and Steel Industries," Industrial and Engineering Chemistry, vol. 31, pp. 1364–80 (1939).

MAURICE A. BRINDISI, *Primary Examiner.*